United States Patent
Small et al.

[19]

[11] Patent Number: 5,921,441
[45] Date of Patent: *Jul. 13, 1999

[54] TELESCOPING COLUMN PIPE ASSEMBLY FOR FUEL DISPENSING PUMPING SYSTEMS

[75] Inventors: Dorsey D. Small, Port Byron, Ill.; Martin J. Traver, Wheatland, Iowa; Edgar E. Dunning, III, Moline, Ill.; G. Todd Clark, Maquoketa, Iowa; Bruce W. Kellums, Edgington, Ill.

[73] Assignee: Marley Pump, Davenport, Iowa

[*] Notice: This patent is subject to a terminal disclaimer.

[21] Appl. No.: 09/109,933

[22] Filed: Jul. 2, 1998

Related U.S. Application Data

[63] Continuation of application No. 08/877,628, Jun. 18, 1997, Pat. No. 5,799,834, which is a continuation-in-part of application No. 08/735,202, Oct. 21, 1996.

[51] Int. Cl.⁶ ........................................................ B67D 5/50
[52] U.S. Cl. ............................ 222/148; 222/379; 222/385; 222/464.5
[58] Field of Search ...................................... 222/148, 379, 222/382, 385, 464.5; 285/302

[56] References Cited

U.S. PATENT DOCUMENTS

| | | | |
|---|---|---|---|
| Re. 31,445 | 11/1983 | Carter | 222/333 |
| 368,654 | 8/1887 | Crosby . | |
| 618,753 | 1/1899 | Ward et al. . | |
| 707,842 | 8/1902 | Hawkins et al. . | |
| 1,303,814 | 5/1919 | Crane . | |
| 1,605,758 | 11/1926 | Moussette | 222/382 |
| 1,619,492 | 3/1927 | Spaeth | 222/379 X |
| 1,733,072 | 10/1929 | Pierce . | |
| 1,789,338 | 1/1931 | Kooperstein . | |
| 2,000,716 | 5/1935 | Polk | 255/28 |
| 2,423,436 | 7/1947 | Blom | 103/87 |
| 2,506,827 | 5/1950 | Goodner | 103/87 |
| 2,742,597 | 4/1956 | Penlington | 318/221 |
| 2,840,119 | 6/1958 | Gavin | 141/21 |
| 2,857,181 | 10/1958 | Myers | 286/7 |
| 3,136,570 | 6/1964 | Lee | 285/193 |
| 3,170,137 | 2/1965 | Brandt | 340/18 |

(List continued on next page.)

FOREIGN PATENT DOCUMENTS

| | | |
|---|---|---|
| 268251 | 5/1988 | European Pat. Off. . |
| 782509 | 9/1957 | United Kingdom . |
| 1242928 | 8/1971 | United Kingdom . |
| 1360732 | 7/1974 | United Kingdom . |

OTHER PUBLICATIONS

F.E. Petro, Inc. Intelligent Submersible Turbine (IST) Brochure dated Oct. 1995.

Exhibit A which includes a drawing dated Feb. 15, 1980, entitled "Adjustable Petro Pumps Design Study", a Request for Engineering Action dated Mar. 7, 1980, handwritten notes bearing initial CFP dated May 1, 1980 and Project Cover Sheet bearing completion date of Dec. 3, 1980.

*Primary Examiner*—Kenneth Bomberg
*Attorney, Agent, or Firm*—Sughrue, Mion, Zinn, Macpeak & Seas, PLLC

[57] ABSTRACT

An adjustable length column pipe for connecting a submersible electric pump in a fuel storage tank with a distribution head that distributes the fuel to dispenser units. Two telescoping column pipes can be telescopically adjusted to the desired length and then locked together by a locking mechanism. An adapter bushing is threaded onto the end of the larger diameter pipe and has a projecting sleeve. A fitting is threaded onto the sleeve and tightened to compress a seal ring which seals the lock assembly to the pipe. Projecting fingers on the fitting are wedged against the smaller telescoping pipe by a nut which is threaded onto the fitting and has a tapered surface to provide progressive wedging action. Electrical wiring for operating the pump is contained within a telescoping conduit assembly which extends inside of the column pipes and is isolated from the fuel passageway by a seal arrangement.

2 Claims, 6 Drawing Sheets

U.S. PATENT DOCUMENTS

| | | | |
|---|---|---|---|
| 3,217,282 | 11/1965 | Chevalier et al. | 339/15 |
| 3,498,647 | 3/1970 | Schroder | 285/343 |
| 3,552,779 | 1/1971 | Henderson | 285/133 |
| 3,621,447 | 11/1971 | Taylor | 339/29 R |
| 3,630,551 | 12/1971 | Brown | 285/330 |
| 3,671,152 | 6/1972 | Guinard | 417/422 |
| 3,688,015 | 8/1972 | Graybill | 174/16 B |
| 3,818,116 | 6/1974 | Kuljian | 174/15 C |
| 3,835,929 | 9/1974 | Suman, Jr. | 166/315 |
| 3,836,273 | 9/1974 | Gutman et al. | 403/377 |
| 3,901,799 | 8/1975 | Adkison | 209/144 |
| 3,917,325 | 11/1975 | Mengeringhausen | 285/344 |
| 3,918,747 | 11/1975 | Putch | 285/4 |
| 3,965,526 | 6/1976 | Doubleday | 15/377 |
| 3,994,516 | 11/1976 | Fredd | 285/39 |
| 3,998,479 | 12/1976 | Bishop | 285/133 A |
| 4,126,406 | 11/1978 | Traylor et al. | 417/373 |
| 4,138,178 | 2/1979 | Miller et al. | 339/15 |
| 4,174,808 | 11/1979 | Latin | 239/23 |
| 4,194,765 | 3/1980 | Reddy | 285/27 |
| 4,198,080 | 4/1980 | Carpenter | 285/277 |
| 4,337,969 | 7/1982 | Escaron et al. | 285/24 |
| 4,436,325 | 3/1984 | Miller | 285/18 |
| 4,500,263 | 2/1985 | Mohn | 417/360 |
| 4,541,782 | 9/1985 | Mohn | 417/244 |
| 4,643,523 | 2/1987 | Smedley et al. | 350/319 |
| 4,652,024 | 3/1987 | Krohn | 285/302 X |
| 4,679,991 | 7/1987 | Harbison et al. | 417/360 |
| 4,693,271 | 9/1987 | Hargrove et al. | 137/565 |
| 4,886,305 | 12/1989 | Martin | 285/133.1 |
| 4,932,686 | 6/1990 | Anderson, Jr. | 285/24 |
| 4,993,756 | 2/1991 | Bechu | 285/319 |
| 5,082,313 | 1/1992 | Bryant et al. | 285/15 |
| 5,088,774 | 2/1992 | Spiegelman | 285/133.1 |
| 5,102,012 | 4/1992 | Foster | 222/40 |
| 5,127,555 | 7/1992 | Mittermaier | 222/189 |
| 5,145,007 | 9/1992 | Dinkins | 166/386 |
| 5,168,748 | 12/1992 | Flora, Jr. et al. | 73/49.2 |
| 5,180,197 | 1/1993 | Thompson, Jr. | 285/351 |
| 5,207,459 | 5/1993 | Glover | 285/23 |
| 5,269,377 | 12/1993 | Martin | 166/385 |
| 5,334,801 | 8/1994 | Mohn | 174/47 |
| 5,341,857 | 8/1994 | Bravo | 141/88 |
| 5,401,064 | 3/1995 | Guest | 285/133.1 |
| 5,423,447 | 6/1995 | Youngs | 220/254 |
| 5,423,575 | 6/1995 | Parks | 285/133.1 |
| 5,425,225 | 6/1995 | Franco | 56/332 |
| 5,454,603 | 10/1995 | Staley | 285/14 |
| 5,474,336 | 12/1995 | Hoff et al. | 285/322 |
| 5,524,935 | 6/1996 | Everts | 285/23 |
| 5,577,895 | 11/1996 | Franklin et al. | 417/238 |
| 5,591,012 | 1/1997 | Langguth et al. | 417/238 |
| 5,595,088 | 1/1997 | Horner | 73/290 |
| 5,799,834 | 9/1998 | Small et al. | 222/148 |

TELESCOPING COLUMN PIPE ASSEMBLY FOR FUEL DISPENSING PUMPING SYSTEMS

CROSS REFERENCE TO RELATED APPLICATIONS

This is a continuation of application Ser. No. 08/877,628 filed Jun. 18, 1997, now allowed, U.S. Pat. No. 5,799,839 the disclosure of which is incorporated herein by reference, which is a continuation-in-part of application Ser. No. 08/735,202, filed on Oct. 21, 1996.

FIELD OF THE INVENTION

This invention relates generally to fuel dispensing systems such as the type commonly installed at gasoline service stations. More specifically, the invention is directed to an adjustable length column pipe which extends between a submersible electric pump in an underground fuel storage tank and a distribution head from which the fuel is distributed to one or more dispensing units.

BACKGROUND OF THE INVENTION

Gasoline service stations normally have underground storage tanks from which the fuel is pumped to dispensing units. A typical installation makes use of a submersible electric pump in the storage tank which operates to pump gasoline or another fuel to a distribution head located above the tank. From the distribution head, the fuel is supplied to the dispensers.

The flow path for the fuel includes a vertical column pipe which extends from the pump to the distribution head. In order to supply electrical power to the pump, the distribution head has electrical connections which are suitably connected with a power source. A conduit extending through the column pipe contains lead wires which supply power to the pump from the electrical connections of the distribution head.

Industry regulations and general safety considerations require that the electrical system meet prescribed standards. It is critical that the electrical system be completely isolated from the fuel in order to prevent fires or explosions that could result from an electrical spark or other electrical problem. It is also necessary to prevent undue leakage of fuel from the column pipe to the surrounding environment. Any field assembly of the components that is necessary must be carried out in a manner to assure compliance with all applicable safety and environmental requirements.

The storage tanks vary in capacity and also vary as to the depth at which they are buried. Consequently, the length of the column pipe assembly can vary considerably between different installations. For this reason, there is a need for a column pipe assembly that can be adjusted in length while maintaining compliance with applicable safety and environmental regulations.

SUMMARY OF THE INVENTION

The present invention is directed to a column pipe assembly that is adjustable in length in the field to accommodate different tank installations. It is a particular feature of the invention that the column pipe assembly may be quickly and easily adjusted in length without impairing the integrity of the electrical system or the pipe containment system, and without creating possible fuel leakage into the electrical system. Another object of the invention is to provide a column pipe assembly which can be adjusted throughout a wide range of possible lengths.

In accordance with the invention, two telescoping column pipes can be extended to the desired length and then locked together by means of a special locking assembly. The locking components include an adapter bushing which is threaded onto the end of the larger column pipe. A sleeve on the adapter bushing surrounds the smaller diameter column pipe and is externally threaded to receive the base of a special fitting. The fitting has a projecting sleeve which carries a plurality of fingers. The sleeve of the fitting is externally threaded so that it can receive a locking nut. The nut has a tapered surface which acts against the fingers to provide a wedging effect that forces the fingers inwardly to grip against the smaller column pipe as the nut is progressively tightened on the fitting. When the nut is fully tightened, the two column pipes are securely locked together to provide the column pipe assembly with the desired overall length.

According to a further embodiment of the locking assembly of the present invention, each of the fingers has a tapered or inclined outer surface near the free end thereof. Further, the nut has an annular ridge portion which is operative to engage the inclined or tapered surfaces of the fingers.

A seal ring is fitted around the smaller column pipe between the end of the bushing sleeve and a shoulder formed on the fitting. When the fitting is threaded on the bushing, the seal ring is squeezed against the pipe to provide an effective seal against its outside surface.

Inside of the column pipes, two telescoping electrical conduits contain the wiring which supplies electrical power to the pump. The conduits are sealed together by a dynamic seal arrangement which accommodates their telescopic extension and retraction as the column pipes are extended or retracted. At the same time, the conduits are effectively sealed to prevent the fuel from leaking into the electrical system.

The seal arrangement between the electrical conduits may include the combination of a rigid plastic cleaner and an O-ring seal at both leak paths.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
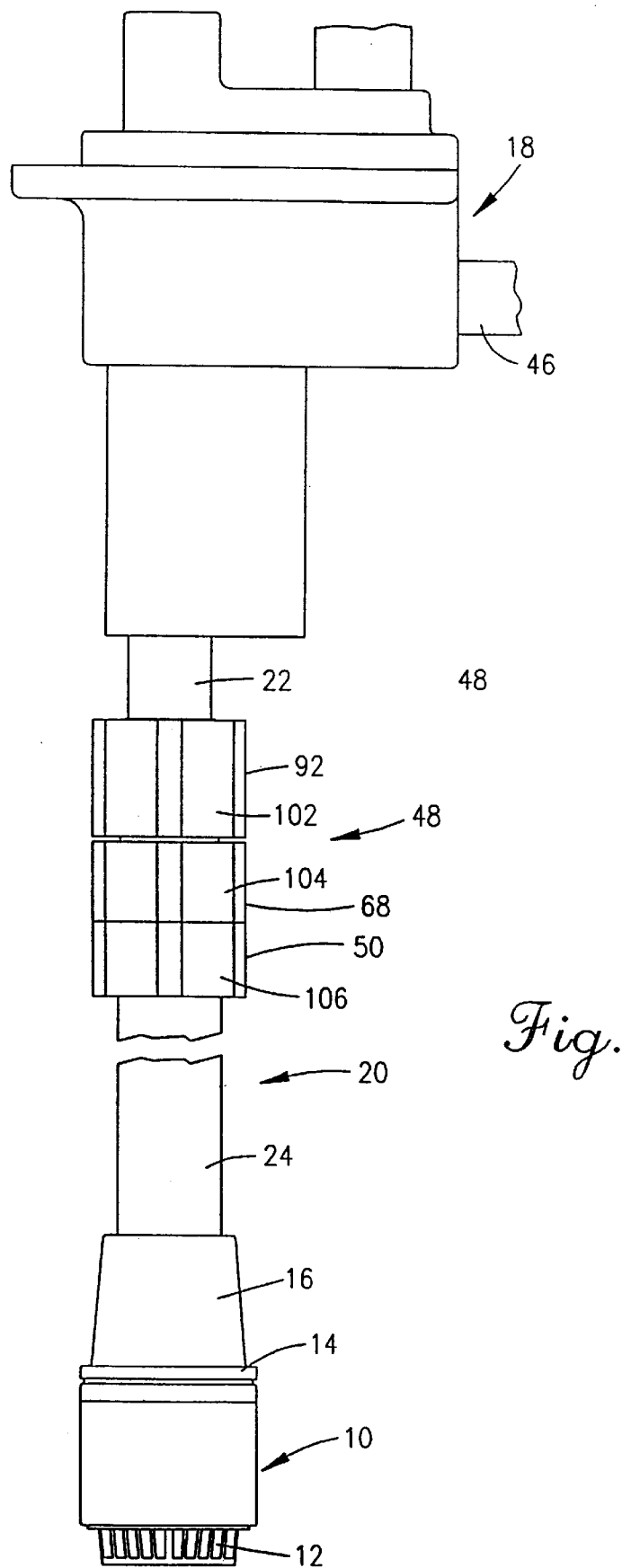
FIG. 1 is an elevational view showing a column pipe assembly constructed according to a preferred embodiment of the present invention installed to extend between a submersible electric pump and a distribution head, with the break lines indicating continuous length.

Referring now to the drawings in more detail and initially to FIG. 1, numeral 10 generally designates a submersible electric pump which is used in a pumping system of the type that operates to pump flammable fuels such as gasoline from an underground storage tank to one or more above-ground dispensing units. This type of pumping system is commonly found in gasoline service stations. The pump 10 is submerged in the fuel contained within the storage tank (not shown) and includes an intake 12 which draws the fuel into the pump when the pump is in operation. The pump 10 is bolted or otherwise secured to a flange 14 formed on the lower end of a discharge head 16. The discharge head 16 has a spool type configuration.

Disposed well above the pump 10 and above the fuel storage tank is a distribution head generally identified by numeral 18. The distribution head is also referred to in the industry as a packer or a manifold. As will be explained more fully, the distribution head 18 is provided with electrical connections for the electrical system which powers the pump 10. The distribution head 18 also receives the fuel which is delivered to it by the pump 10, and it directs the fuel to one or more above ground dispensing units (not shown).

In accordance with the present invention, a telescoping column pipe assembly which is generally identified by numeral 20 connects the pump 10 with the distribution head 18. The column pipe assembly 20 includes an upper column pipe 22 and a larger diameter lower column pipe 24 which telescopically receives the upper pipe 22.

Figure 5:
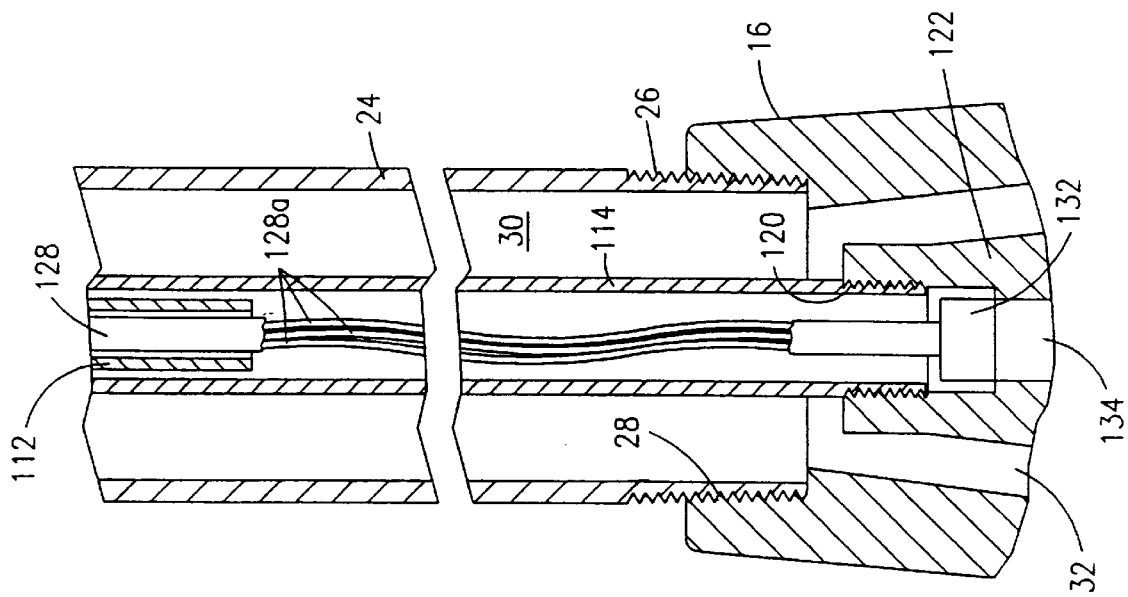
FIG. 5 is a fragmentary sectional view taken on a vertical plane through the lower portion of the column pipe 25 assembly, with the break lines indicating continuous length.

As best shown in FIG. 5, the bottom end of the lower pipe 24 is externally threaded at 26. The top end of the discharge head 16 is internally threaded at 28 to mate with the threads 26 of pipe 24. The discharge head 16 is thus mounted on the bottom end of pipe 24 by means of the threaded connection provided by the threads 26 and 28. The interior of the lower column pipe 24 serves as a flow passage 30 for the fuel which is pumped by the pump 10. The discharge head 16 also has an interior passage 32 which connects with the discharge side of the pump 10 in order to receive the fuel and direct it into the flow passage 30.

Figure 4:
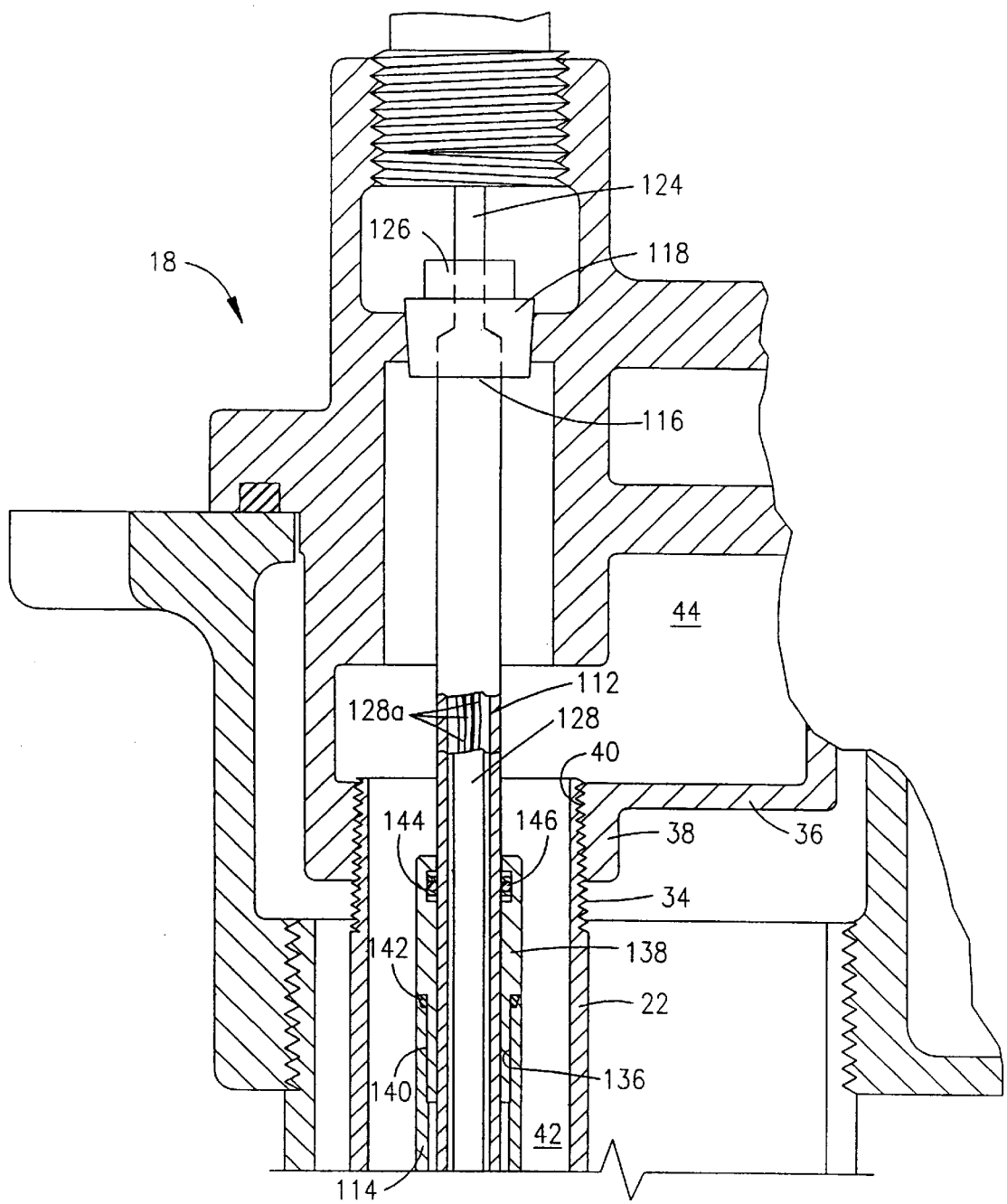
FIG. 4 is a fragmentary sectional view taken on a vertical plane through the distribution head and the upper portion of the column pipe assembly.

With particular reference to FIG. 4, the top end of the upper column pipe 22 is externally threaded at 34. The distribution head 18 includes a packer block 36 having a neck 38 on its lower end which is go internally threaded at 40. A threaded connection is established between the column pipe 22 and the block 36 by the mating threads 34 and 40. This mounts the column pipe assembly 20 to the distribution head 18. The interior of column pipe 22 serves as a flow passage 42 which receives the fuel and directs it into a flow chamber 44 provided by the packer block 36. The chamber 44 in turn connects with a distribution pipe 46 (see FIG. 1) which leads to one or more of the dispensing units in order to deliver the fuel to those dispensing units.

Figure 2:
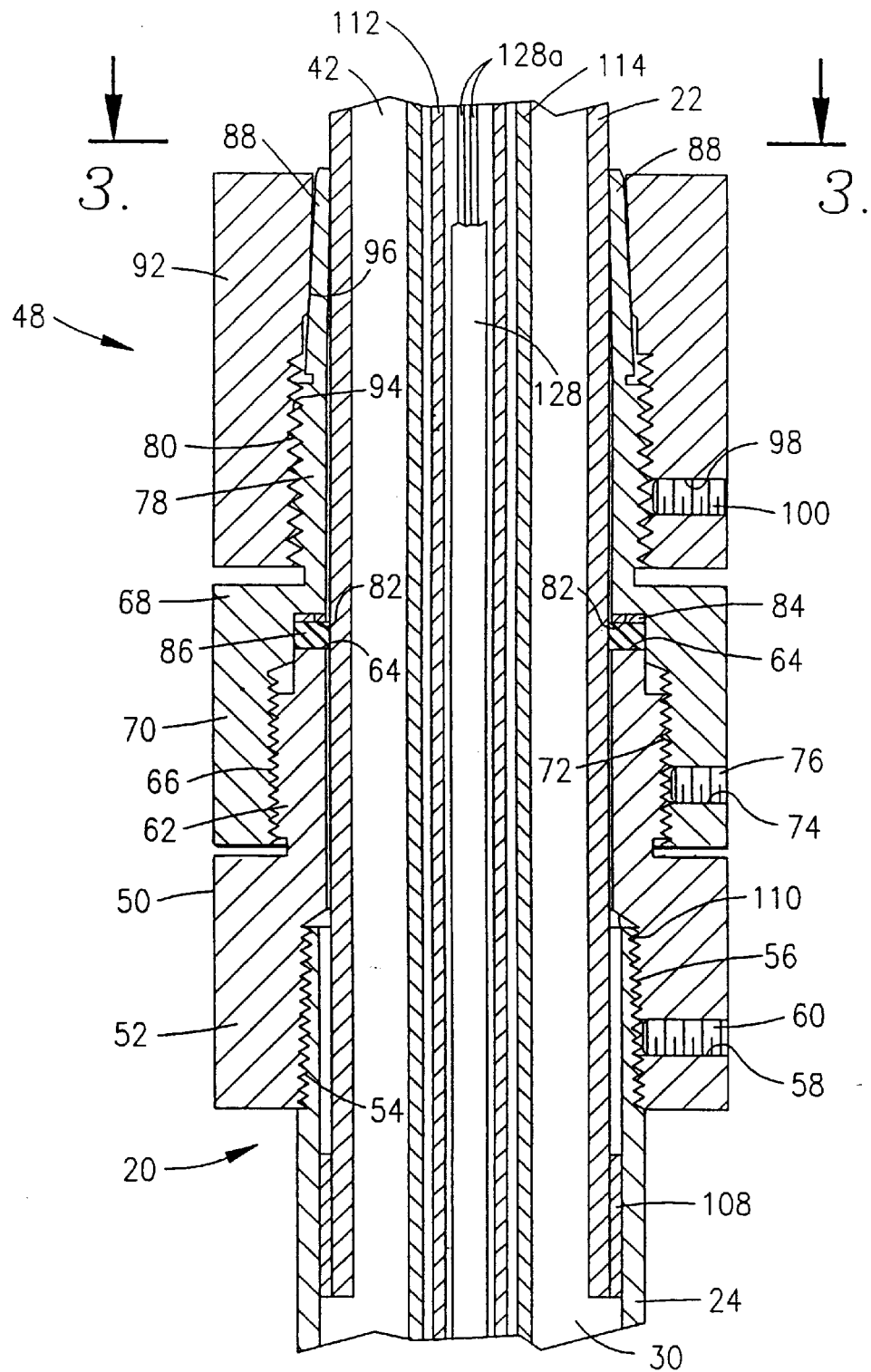
FIG. 2 is a fragmentary sectional view on an enlarged scale taken on a vertical plane through the locking mechanism which locks the column pipe assembly at the desired length.

The telescoping pipes 22 and 24 may be locked together by a locking mechanism which is generally identified by numeral 48 and a first embodiment of which is best shown in detail in FIG. 2. The upper pipe 22 fits inside of the larger diameter lower pipe 24 and may be telescopically extended and retracted therein. The locking mechanism 48 includes an adapter bushing 50 having a relatively large base portion 52 which is internally threaded at 54. The upper end portion of the pipe 24 is externally threaded at 56 so that the base portion 52 of the adapter bushing can be threaded onto the threads 56 to mount the bushing on pipe 24. The base 52 is provided on one side with an internally threaded passage 58 which receives a set screw 60. The set screw 60 may be tightened against the pipe 24 in order to securely lock the adapter bushing 50 in place on the end of pipe 24.

The adapter bushing 50 has a barrel or sleeve portion 62 which is cylindrical and extends upwardly from the base portion 52. The inside surface of the sleeve 62 fits around the outside surface of the upper column pipe 22 and is spaced slightly outwardly therefrom. The sleeve portion 62 terminates at its top end in a flat end surface 64 which is annular and which faces upwardly. The sleeve portion 62 is externally threaded at 66. The sleeve portion 62 is located beyond the end of the lower column pipe 24.

The locking mechanism 48 includes a special fitting 68 which may be connected with the adapter bushing 50. The fitting 68 has a base portion 70 which is internally threaded as indicated at 72. The threads 72 mate with the threads 66 on sleeve 62 in order to establish a threaded connection of the fitting 68 with the bushing 50. One side of the base 70 is provided with a threaded passage 74 which receives a set screw 76. The set screw 76 may be threaded into passage 74 and tightened against the sleeve 62 in order to lock the fitting 68 to the adapter bushing 50.

The fitting 68 has a sleeve portion 78 which is generally cylindrical and extends upwardly from the base 70. The sleeve 78 extends around pipe 22 and is spaced slightly outwardly therefrom. The sleeve 78 has external threads 80.

A flat internal shoulder 82 is provided on the fitting 68 at a location near the intersection between the base 70 and sleeve 78. The shoulder 82 is annular and is spaced from and faces toward the end surface 64. The shoulder 82 and end surface 64 are approximately equal in surface area. A flat backup ring 84 is seated on the shoulder 82. A seal ring 86 which may be constructed of an elastomeric material is located between the shoulder 82 and the end surface 64 of sleeve 62. When the fitting 68 is tightened on the adapter bushing 50, the seal ring 86 is squeezed between the backup ring 84 and the end surface 64. This squeezing of ring 86 compresses it radially and forces it against the outside surface of the upper column pipe 22, thereby providing a fluid tight seal between the column pipe, the bushing 50 and the fitting 68.

Figure 3:
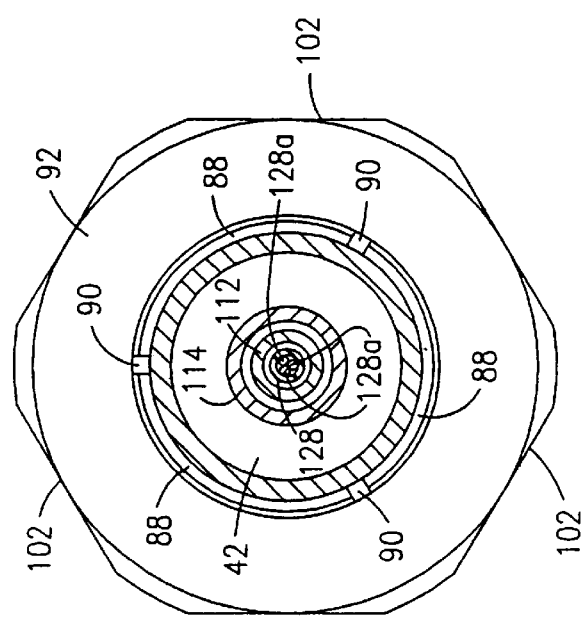
FIG. 3 is a sectional view taken generally along line 3—3 of FIG. 2 in the direction of the arrows.

Carried on the upper end of the sleeve portion 78 of fitting 68 are a plurality of relatively flexible prongs or fingers 88. As best shown in FIG. 3, the fingers 88 are arcuate, and it may be convenient to provide three of them (although a different number may be provided). The fingers 88 are separated circumferentially from one another by small gaps 90. The fingers 88 cooperate to extend around substantially the entire circumference of pipe 22, except for the small gaps 90. The fingers 88 are flexible enough that they can flex in and out about their lower ends where they connect with the sleeve 78.

The final component of the locking assembly 48 is a nut 92 having a bore which is internally threaded at 94 to mate with the threads 80 on the sleeve 78. The threads 94 do not extend the entire height of the bore of nut 92. Beyond the threads 94, the upper portion of the bore of nut 92 presents an unthreaded surface 96 which tapers inwardly from bottom to top. The tapered surface 96 acts against the outside surfaces of the fingers 88 and presses the fingers inwardly toward pipe 22 as the nut 92 is progressively tightened on the fitting 68. One side of the nut 92 is provided with an internally threaded passage 98 which receives a set screw 100. The set screw 100 may be tightened against sleeve 78 in order to securely lock the nut 92 on the fitting 68.

The set screws 60, 76 and 100 may be eliminated and replaced by self locking threads of the type commercially available as SPIRALOCK threads. All NPT threaded joints are secured with a permanent self locking thread sealant.

The nut 92 has wrench flats 102 (see FIGS. 1 and 3) on its outside surface in order to facilitate application and removal of the nut with a wrench or similar tool. Likewise, the base 70 of fitting 68 is provided with wrench flats 104 (FIG. 1), as is the base 52 of the adapter bushing 50 (as indicated at 106 in FIG. 1).

When the locking mechanism 48 is released, the pipes 22 and 24 can be telescopically extended or retracted relative to one another to adjust the column pipe assembly 20 to the desired overall length. As shown in FIG. 2, the bottom of the upper pipe 22 is flared outwardly or otherwise extended outwardly as at 108. The extended portion 108 fits closely inside of the lower column pipe 24. When the column pipe assembly 20 is fully extended, the edge of the extended portion 108 butts against a shoulder surface 110 formed interiorly of the adapter bushing 50. The engagement between the extended portion 108 and shoulder 110 prevents pipe 22 from being extended far enough to separate from the other pipe 24. In this fashion, the extended portion 108 provides a stop that prevents separation of the column pipes.

Extending concentrically within the column pipe assembly 20 is an electrical conduit assembly which includes an upper conduit 112 and a lower conduit 114. The upper conduit 112 is smaller in diameter than the lower conduit 114 and has a telescopic fit in the lower conduit.

As best shown in FIG. 4, the upper conduit 112 has a gas tight welded top end 116 which is secured to a fitting 118 mounted to the packer block 36. As shown in FIG. 5, the lower conduit 114 has a threaded bottom end 120 which is threaded into a gland 122 forming part of the discharge head 16.

With reference again to FIG. 4, an electrical cable assembly 128 extends from a source of electrical power through an upper portion 126 of the block 118 in the distribution head 18. The electrical cable assembly extends through block 118 and through the telescoping conduit assembly in order to provide electrical power to operate the submersible pump 10. The cable assembly 128 extends through the upper conduit 112 and also through the lower conduit 114. The cable assembly 128 may include, by way of example, one cable containing three individually insulated electrical wire conductors, designated 128a in FIG. 3. Alternatively, three separate individually insulated power lines or wires without a surrounding sheath may be utilized.

The electrical cable can be cut in the field to the proper length. Alternatively, the lower portion of the cable assembly 128 located within the conduit 114 may be coiled in a spiral fashion so that the cord can extend and retract as the conduit assembly is extended and retracted. The lower end of the cable extends to an electrical connector 132 that mates with another electrical connector 134 carried by the gland 122 of the discharge head 16. The connector 134 provides an electrical connection for the pump 10.

Referring particularly to FIG. 4, the top end of the lower conduit 114 is machined at 136. A sleeve 138 has its lower portion machined at 140 to provide a press fit connection for mounting of the sleeve 138 on the top end of conduit 114. A seal ring 142 is compressed between the barrel portion of sleeve 138 and the end of conduit 114 to provide a seal preventing fuel from leaking into the conduit assembly from the flow path 42. Scrapers are added to remove debris from conduit 112 that might damage the O-rings.

The sleeve 138 fits closely around the smaller diameter upper conduit 112, and the sleeve bore is provided near its upper end with an annular groove 144. A dynamic O-ring seal 146 is mounted in the groove 144 to provide a seal between the sleeve 138 and the upper conduit 112. The dynamic seal 146 accommodates telescopic extension and retraction of conduit 112 relative to conduit 114 and at the same time maintains an effective fluid tight seal between the two conduits of the conduit assembly.

In use, the nut 92 is initially applied to the threads 80 loosely such that the fingers 88 are not pressed tightly against pipe 22. Likewise, the fitting 68 is initially applied to the threads 66 in a loose condition so that the seal ring 86 is not squeezed tightly against pipe 22. This allows the pipes 22 and 24 to be telescopically adjusted to the proper overall length to accommodate the tank installation in which the column pipe assembly is to be installed. When the pipes 22 and 24 have been adjusted to the proper length, the base 68 is tightened fully onto the adapter bushing 50 so that the seal ring 86 is compressed to provide an effective seal against pipe 22. Preferably, but not necessarily, the end of the base 70 is butted against base 52 of the adapter bushing, and the parts are secured in this position by tightening of the set screw 76 or by the self locking threads.

The nut 92 is then tightened onto sleeve 78, preferably with a wrench applied to the wrench flats 102. As the nut is progressively tightened on the fitting 68, the taper of surface 96 acting against the fingers 88 forces the fingers inwardly by wedging action against the outside surface of pipe 22. The fingers 88 thus grip against pipe 22 and, when the nut 92 is fully tightened, the fingers 88 securely grip against pipe 22 to lock it in place and prevent it from extending or retracting relative to the lower column pipe 24. The electrical conduits 112 and 114 are similarly telescopically adjusted to the proper length, and this is easily accomplished since the smaller diameter pipe 112 can simply be slid inwardly or outwardly relative to the larger diameter conduit 114 until the desired overall length of the conduit assembly is achieved.

The column pipe assembly 20 can then be installed. It is noted that a fuel flow path is provided from the pump through passage 32 of the discharge head 16, through the flow passage 30 provided within the lower column pipe 24, through the flow passage 42 provided within the upper column pipe 22 and through chamber 44 of the distribution head to pipe 46 from which the fuel is delivered to the dispensing unit. The telescoping conduit assembly encloses the electrical cord 128 and maintains it isolated from the fuel flow path so that the electrical system remains completely isolated from the fuel in order to comply with applicable regulations and maintain safe conditions.

It is thus apparent that the column pipe assembly of the present invention accommodates quick and easy field adjustment to the proper length while maintaining the integrity of the fuel containment within the column pipe and also maintaining isolation between the fuel and the electrical system which applies power for operation of the pump 10. If the column pipe needs adjustment to a different length, this can be accomplished by loosening nut 92 and fitting 68 to the extent necessary to allow the column pipe adjustment before again tightening the fitting and nut and securing them with the set screws or the self locking threads.

Figure 6:
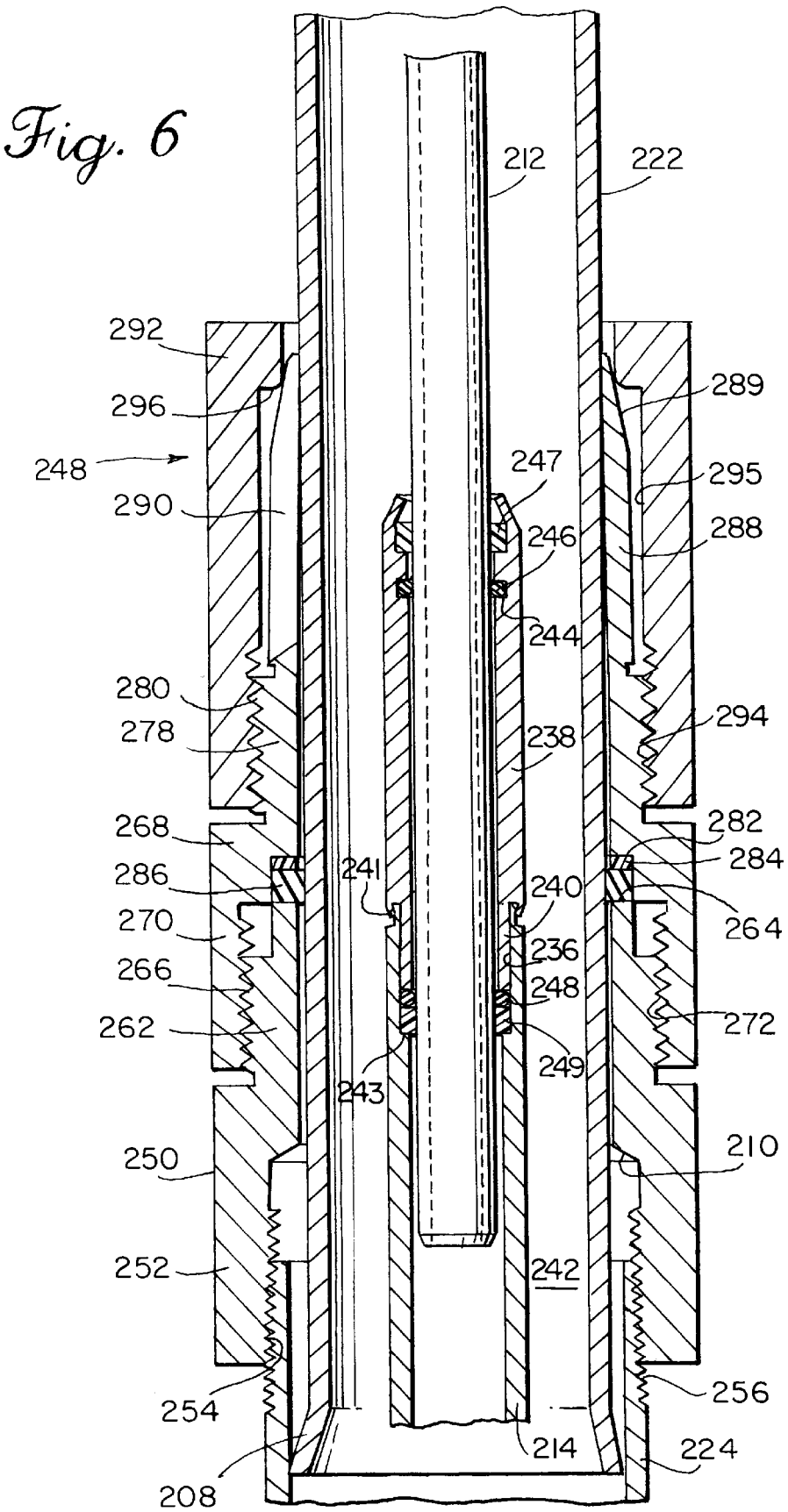
FIG. 6 is a fragmentary sectional view taken on a vertical plane through the locking mechanism according to a further embodiment, and also showing an alternative embodiment of the telescopic connection of the electrical conduit assembly.
Figure 7:
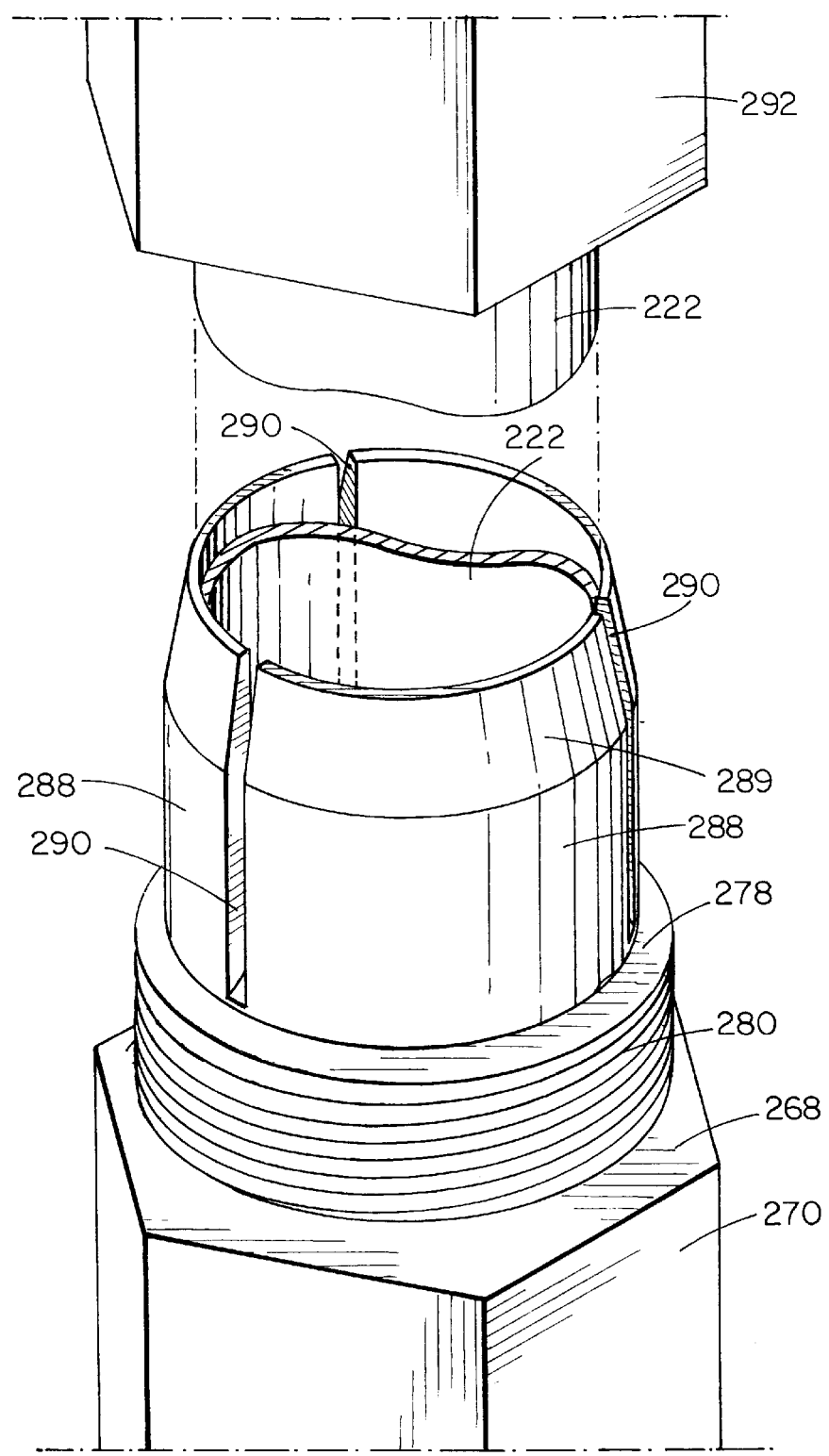
FIG. 7 is a fragmentary perspective view of the locking mechanism of FIG. 6 and showing the fingers.

FIGS. 6 and 7 illustrate a further embodiment of the locking mechanism according to the present invention, and also an alternative embodiment of the telescopic connection of the electrical conduit assembly. More specifically, FIG. 6 shows a fragmentary sectional view similar to FIG. 2 through the further embodiment according to the present invention. In this further embodiment, the locking mechanism is generally identified by the numeral 248. Again, the upper pipe 222 fits inside of the larger diameter lower pipe 224 and may be telescopically extended and retracted therein. The locking mechanism 248 includes an adapter bushing 250 having a relatively large base portion 252 which is internally threaded at 254. The upper end portion of the pipe 224 is externally threaded at 256 so that the base portion 252 of the adapter bushing can be threaded onto the threads 256 to mount the bushing on the pipe 224.

The adapter bushing 250 has a barrel or sleeve portion 262 which is cylindrical and extends upwardly from the base portion 252. The inside surface of the sleeve 262 fits around the outside surface of the upper column pipe 222 and is spaced slightly outwardly therefrom. The sleeve portion 262 terminates at its top end and a flat end surface 264 which is annular and which faces upwardly. The sleeve portion 262 is externally threaded at 266. The sleeve portion 262 is located beyond the end of the lower column pipe 224.

The locking mechanism 248 according to this further embodiment also includes a special fitting 268 which may be connected with the adapter bushing 250. The fitting 268 has a base portion 270 which is internally threaded as indicated at 272. The threads 272 mate with the threads 266 on the sleeve portion 262 in order to establish a threaded connection of the fitting 268 with the bushing 250.

The fitting 268 has a sleeve portion 278 which is generally cylindrical and extends upwardly from the base 270. The sleeve 278 extends around the pipe 222 and is spaced slightly outwardly therefrom. The sleeve 278 has external threads 280.

A flat internal shoulder 282 is provided on the fitting 268 at a location near the intersection between the base 270 and the sleeve 278. The shoulder 278 is annular and is spaced from and faces toward the end face 264. The shoulder 282 and end surface 264 are approximately equal in surface area. A flat back-up ring 284 and a seal ring 286 (which again may be constructed of an elastomeric material) are disposed between the shoulder 282 and the end surface 264 of the sleeve portion 262. When the fitting 268 is tightened on the adapter bushing 250, the seal ring 286 is squeezed between the back-up ring 284 and the end surface 264, or alternatively between the back-up ring 284 and the shoulder 282. Such squeezing of the ring 286 compresses the ring radially and forces it against the outside surface of the upper column pipe 222, thereby providing a fluid tight seal between the upper column pipe 222, the bushing 250 and the fitting 268.

The upper end of the sleeve portion 278 of the fitting 268 includes a plurality of relatively flexible prongs or fingers 288. As best shown in FIG. 7, the fingers 288 are arcuate, and again preferably, but not necessarily, three of the fingers are provided, although a different number may be provided. The fingers 288 are separated circumferentially from one another by small gaps 290. The fingers 288 cooperate to extend around substantially the entire circumference of the pipe 222, except for the small gaps 290. The fingers 288 are flexible enough that they can flex in and out about their lower ends where they connect to the sleeve 278. In this further embodiment, each of the fingers 288 has a tapered or inclined outer surface 289 near the free end thereof (i.e., the top portion thereof as shown in FIG. 6).

The locking assembly 248 further includes a nut 292 having a bore which is internally threaded at 294 to mate with the threads 280 on the sleeve 278. The threads 294 extend over only a portion of the overall height of the bore of the nut 292.

Beyond the threads 294, the upper portion of the bore of the nut 292 presents an unthreaded, substantially cylindrical internal surface 295 extending up to an annular ridge portion 296 which is operative to engage the inclined or tapered surfaces 289 of the fingers 288. Accordingly, as the nut 292 is progressively tightened on the fitting 268, the ridge portion 296 of the nut 292 presses against the inclined or tapered outer surfaces 289 of the fingers 288 to in turn press the fingers inwardly toward the pipe 222.

In the further embodiment shown in FIGS. 6 and 7, the set screws 60, 76 and 100 and corresponding threaded receiving holes shown in FIG. 2 have been eliminated and replaced by self-locking threads of the type commercially available as SPIRALOCK threads. Again, all NPT threaded joints are secured with a permanent self-locking thread sealant.

The nut 292 has wrench flats (see FIG. 7) similar to wrench flats 102 on its outside surface in order to facilitate application and removal of the nut with a wrench or similar tool. Likewise, the base 270 of the fitting 268 is provided with wrench flats similar to wrench flats 104, as is the base 252 of the adapter bushing 250.

When the locking mechanism 248 is released, the pipes 222 and 224 can be telescopically extended or retracted to one another to adjust the column pipe assembly to the desired overall length. As shown in FIG. 6, the bottom of the upper pipe 222 is flared outwardly as at 208. The flared portion 208 fits closely inside of the lower column pipe 224. When the column pipe assembly is fully extended, the edge of the flared portion 208 abuts against a shoulder surface 210 formed interiorly of the adapter bushing 250. The engagement between the flared portion 208 and the shoulder 210 prevents the pipe 222 from being extended far enough to separate from the outer pipe 224. In this fashion, the flared portion 208 provides a stop that prevents separation of the column pipes.

With the above-described structure of the locking mechanism 48, 248, the fingers 288 are flexible and can be easily tightened and backed off on site during installation, so that if the original length set by the installer is not correct, it can be easily reset on site (i.e., the present design allows for repeatability). Moreover, since the fingers are flexible, no permanent deformation to the fingers will occur, and any permanent distortion to the pipe 222 will be avoided, thereby allowing the locking assembly to be easily reset at the site.

As noted above, FIG. 6 also shows an alternative embodiment of the telescopic connection of the electrical conduit assembly. In particular, the top end of the lower conduit 214 is again machined as at 236. A sleeve member 238 has its lower portion machined as at 240 to provide a press fit connection for mounting of the sleeve 238 on the top end of the conduit 214. The sleeve 238 may also be crimped over the upper end of the conduit 214 as shown at 241. At the lower leak path, an annular, for example, TEFLON, cleaner 249 and an O-ring seal 248 are positioned so as to be compressed between the lower end of sleeve 238 and an internal ledge 243 formed within the machined portion of the lower conduit 214, so as to provide a seal preventing fuel from leaking into the conduit assembly from the flow path 242. The TEFLON cleaner 249 is utilized to remove debris from the conduit 212 that might damage the O-ring. Although TEFLON is preferred, other suitable materials may be used for the cleaners 247 and 249, such as rigid plastics.

The sleeve 238 fits closely around the smaller diameter upper conduit 212, and the sleeve bore is provided near its upper end within an annular groove 244. A dynamic O-ring seal 246 is mounted in the groove 244 to provide a seal between the sleeve 238 and the upper conduit 212. The dynamic seal 246 accommodates telescopic extension and retraction of the conduit 212 relative to the conduit 214 and at the same time maintains an effective fluid tight seal between the two conduits of the conduit assembly. An upper annular TEFLON cleaner 247 is positioned above the groove 244 and is held in position by crimping the upper end of the sleeve 238 as shown in FIG. 6. The TEFLON cleaner again is provided for removing debris from the conduit 212 that might damage the O-rings.

The seal arrangement between the electrical conduits also serves as a flame proof seal should an arcing or sparking occur in the electrical cable (note that the electrical cable 128 is not shown in FIG. 6 to simplify the drawing for ease of understanding).

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed:

1. An apparatus adjustably connecting a submersible electric pump to a distribution head which receives flammable fuel pumped by the pump, said apparatus comprising:

first and second pipes connected to telescopically extend and retract, said first pipe being connected with the distribution head and said second pipe being connected with the pump to establish a flow path for the fuel through the pipes from the pump to the distribution head;

first and second electrical conduits connected telescopically and extending inside of said first and second pipes, said first conduit being connected with the distribution head and said second conduit being connected with the pump;

electrical wiring extending in said first and second electrical conduits from the distribution head to the pump to supply electrical power for operation of the pump;

a seal arrangement disposed between said first and second electrical conduits and which isolates said wiring from the fuel in said flow path, said seal arrangement allowing said first and second electrical conduits to extend and retract telescopically;

a fitting connected to one of said pipes and having a plurality of flexible fingers overlapping an other of said pipes, said plurality of flexible fingers comprising at least three fingers which are separated circumferentially from one another by gaps which are small relative to said fingers, each of said fingers having an inclined outer surface at a free end thereof; and a releasable pressing member which presses said fingers against said other pipe into gripping engagement therewith to lock said pipes together, said releasable pressing member comprising a nut having threaded engagement with said fitting and an annular ridge portion which is operative to engage said inclined outer surfaces of said fingers to progressively force said fingers toward said other pipe as the nut is threaded onto said fitting.

2. The apparatus as set forth in claim 1, including a seal ring which effects a seal between said fitting and said other pipe.

* * * * *